(12) United States Patent
Scoca et al.

(10) Patent No.: US 7,768,873 B2
(45) Date of Patent: Aug. 3, 2010

(54) COMBINED SPATIAL-TEMPORAL CORRELATION SONAR

(75) Inventors: Anthony L. Scoca, Hicksville, NY (US); James G. Huber, North Babylon, NY (US); Barry S. Schwartz, East Meadow, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 368 days.

(21) Appl. No.: 12/042,198

(22) Filed: Mar. 4, 2008

(65) Prior Publication Data

US 2009/0059723 A1    Mar. 5, 2009

Related U.S. Application Data

(60) Provisional application No. 60/894,888, filed on Mar. 14, 2007.

(51) Int. Cl.
*G01S 15/60*    (2006.01)
(52) U.S. Cl. .................................................. 367/89
(58) Field of Classification Search .................. 367/89, 367/91; 702/143
See application file for complete search history.

(56) References Cited

U.S. PATENT DOCUMENTS

| | | | | |
|---|---|---|---|---|
| 4,244,026 A | * | 1/1981 | Dickey, Jr. | 367/89 |
| 5,315,562 A | * | 5/1994 | Bradley et al. | 367/89 |
| 6,804,167 B2 | * | 10/2004 | Scoca et al. | 367/89 |
| 7,295,492 B2 | * | 11/2007 | Scoca et al. | 367/89 |
| 7,495,996 B2 | * | 2/2009 | Huber et al. | 367/89 |
| 7,525,875 B2 | * | 4/2009 | Scoca et al. | 367/89 |

OTHER PUBLICATIONS

Hole et al., "Design Constraints and Eror Analysis of the Temporal Correlation Log," IEEE Journal of Oceanic Engineering, vol. 17, No. 3, Jul. 1992.*
Schock et al, "Spatial and Temporal Pulse Design Considerations for Marine Sediment Classification Sonar," IEEE Journal of Oceanic Engineering, vol. 19, No. 3, Jul. 1994.*

* cited by examiner

*Primary Examiner*—Ian J Lobo
(74) *Attorney, Agent, or Firm*—DeMont & Breyer, LLC

(57) ABSTRACT

A system is disclosed that provides a sonar system featuring combined spatial and temporal correlation array processing. The disclosed system merges spatial-based velocity errors with temporal-based velocity errors by using a combining algorithm that is based on the optimization criteria that the output after combining has no bias error and has a minimized mean square error. With these criteria, the combining algorithm takes the form of a weighted summation of the spatial data stream and temporal data stream inputs with the weights being a function of the relative velocity errors. In combining spatial and temporal processing in this manner, the disclosed system provides improved velocity measurements for a wider range of ship's speeds. In particular, the system achieves performance levels of a spatial correlation sonar for low ship's speeds for which a temporal correlation sonar solution might not be available. The system also achieves performance levels of a temporal correlation sonar for high ship's speeds for which a spatial correlation sonar solution might not be available.

24 Claims, 6 Drawing Sheets

Figure 3 (Prior Art)

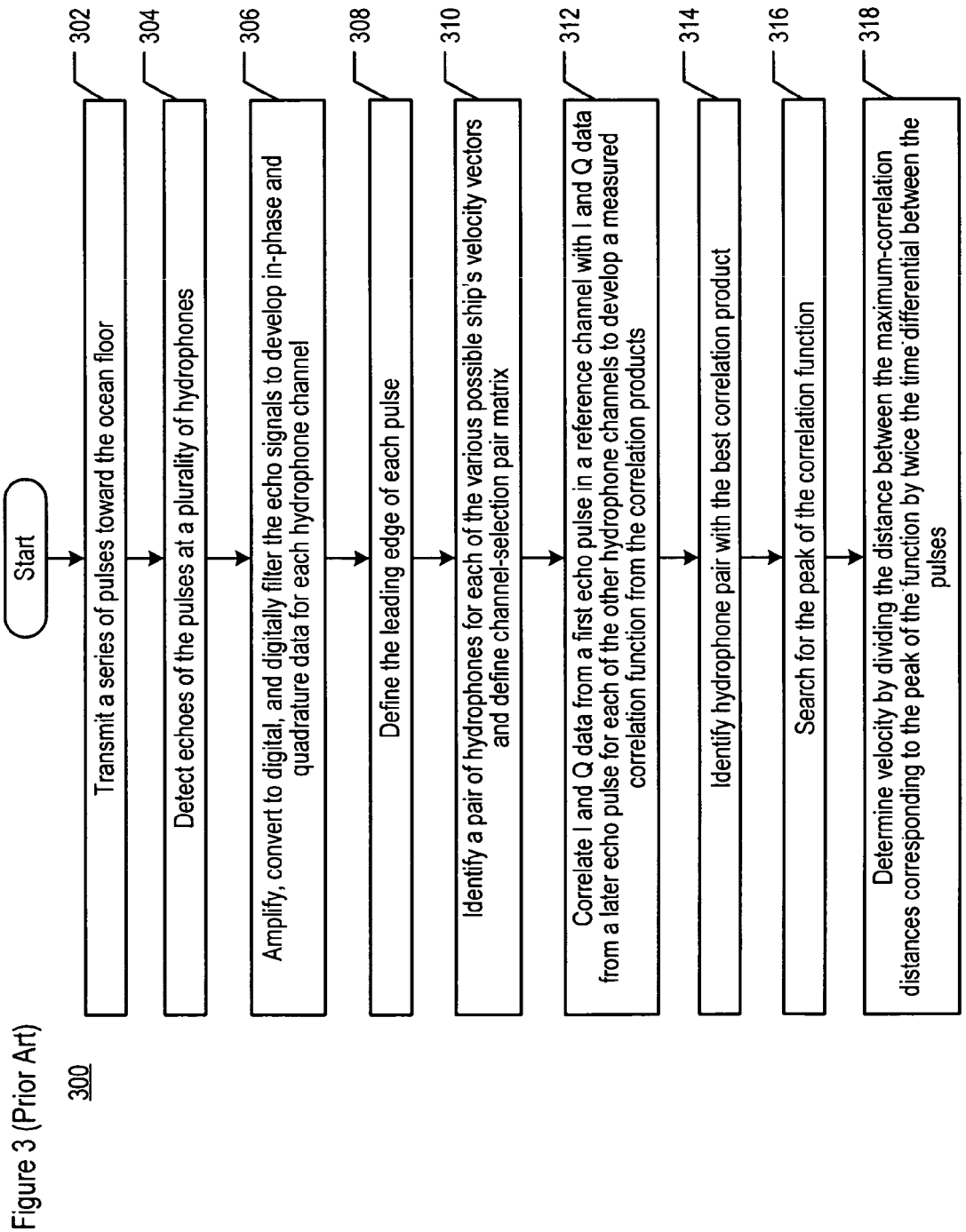

300

302 — Transmit a series of pulses toward the ocean floor

304 — Detect echoes of the pulses at a plurality of hydrophones

306 — Amplify, convert to digital, and digitally filter the echo signals to develop in-phase and quadrature data for each hydrophone channel 308 — Define the leading edge of each pulse 310 — Identify a pair of hydrophones for each of the various possible ship's velocity vectors and define channel-selection pair matrix 312 — Correlate I and Q data from a first echo pulse in a reference channel with I and Q data from a later echo pulse for each of the other hydrophone channels to develop a measured correlation function from the correlation products 314 — Identify hydrophone pair with the best correlation product 316 — Search for the peak of the correlation function 318 — Determine velocity by dividing the distance between the maximum-correlation distances corresponding to the peak of the function by twice the time differential between the pulses

500

COMBINED SPATIAL-TEMPORAL CORRELATION SONAR

CROSS REFERENCE TO RELATED APPLICATIONS

The underlying concepts, but not necessarily the language, of the following case are incorporated by reference:

(1) U.S. Pat. No. 60/894888, filed Mar. 14, 2007.

If there are any contradictions or inconsistencies in language between this application and the case incorporated by reference that might affect the interpretation of the claims in this application, the claims in this application should be interpreted to be consistent with the language in this application.

FIELD OF THE INVENTION

The present invention relates generally to SONAR systems, and, more particularly, to correlation SONAR systems.

BACKGROUND OF THE INVENTION

SONAR (SOund Navigation And Ranging)—or sonar—is the generic name of the technology that is used to locate objects underwater. Sonar is used in marine, geological, and biological research, undersea mapping and navigation, and various commercial and military applications.

An "active" sonar system is a type of sonar system in which a "projector" emits a pulse of sound and underwater microphones called "hydrophones" receive underwater sounds to be signal processed. If the transmitted pulses encounter an underwater object (a "target"), a portion of the sound is reflected as an "echo." Knowing the speed of sound in water and the time for the sound wave to travel to the target and back, the distance between the listening-post vessel (e.g., ship, etc.) and the target can be calculated. Active sonar systems generally use highly directional beams of sound when searching for targets, which enable them to determine direction to the target, as well as the distance.

Another application of active sonar processing is for measuring the velocity of the sound-projecting vessel itself. The sonar source of the vessel directs sonic pulses towards the ocean floor, and the receivers detect echoes of those pulses. The velocity of the vessel is then calculated based upon the distance traveled by the vessel between the transmission and reception of a first pulse and a second pulse. Examples of velocity-measurement sonars are spatial correlation sonar and temporal correlation sonar, which rely on selecting a maximum "correlation" between hydrophones in the case of spatial correlation or pulses in the case of temporal correlation.

A spatial correlation sonar requires an array of many hydrophones with associated electronics components; consequently, spatial correlation sonar might be burdened with major ship's array installation costs. In contrast, a basic temporal correlation sonar requires only three hydrophones with reduced support electronics; as a result, temporal correlation sonar is likely to have lower ship's installation costs. A spatial system requires substantial processing to form arrays and extract ship's velocity via time-consuming array processing, whereas processor throughput requirements are reduced for a temporal system which does not need to deal with multiple velocity vectors and time-consuming array processing.

With respect to operating conditions, a spatial correlation system performs well for low ship's speeds, but its performance steadily degrades as speed increases. This is because it must reduce the time between correlated pulses (i.e., the correlation time) in order to keep the correlation solution limited to involving hydrophone pairs inside the limited-size hydrophone array while allowing for ship's dynamics. A spatial system's correlation time is a compromise value to allow for (i) a maximum ship's speed in one chosen direction (e.g., forward), (ii) the use of as large a value as possible consistent with the hydrophone array dimensions, and (iii) the use of a value that allows for variations in ship's velocity estimates in a sonar cycle. These conditions may result in a spatial correlation sonar being unable to make use of the full hydrophone array size.

In contrast, a temporal correlation system cannot function for low ship's speeds because this requires the use of an excessively long and often unachievable time between correlated pulses (i.e., the time separation between correlated pulses which exceeds the transmit-to-echo roundtrip time). A temporal correlation sonar, however, provides a performance enhancement for high ship's speeds by making full use of the size of a hydrophone array in all directions and permits further high speed performance improvements by use of available hydrophones that are external to a correlation sonar hydrophone array.

What is needed is an integrated sonar system that provides the performance benefits of both spatial and temporal correlation sonars, as well as a means of detecting whether one of these correlation sonar systems is performing poorly, without some of the disadvantages in the prior art.

SUMMARY OF THE INVENTION

The present invention provides a sonar system that features combined spatial and temporal correlation array processing. In accordance with the illustrative embodiment of the present invention, the disclosed sonar system merges spatial-based velocity errors with temporal-based velocity errors. The merging is accomplished by using a combining algorithm that is based on the optimization criteria that the output after combining has no bias error and has a minimized mean square error. With these criteria, the combining algorithm takes the form of a weighted summation of the spatial data stream and temporal data stream inputs with the weights being a function of the relative velocity errors.

In combining spatial and temporal processing in this manner, the system of the illustrative embodiment provides improved velocity measurements for a wider range of ship's speeds. In particular, the illustrative-embodiment system achieves performance levels of a spatial correlation sonar for low ship's speeds for which a temporal correlation sonar solution might not be available. The system also achieves performance levels of a temporal correlation sonar for high ship's speeds for which a spatial correlation sonar solution might not be available.

The system of the illustrative embodiment also provides an improvement in sonar system reliability by providing ship's velocity measurements in cases where one or more hydrophone-channel failures would render either the spatial or temporal systems individually inoperative. Additionally, because of the different characteristics of the spatial and temporal correlation sonar systems, each correlation system is used to monitor the performance of the other, as part of an integrity improvement that was previously unavailable with systems in the prior art. As part of the monitoring, in some embodiments an alarm is provided to indicate that the spatial or temporal correlation velocity solution is inaccurate at a particular moment.

There are a number of performance benefits to being able to improve correlation system accuracy, availability, reliability and integrity. One benefit is that a velocity estimation with greater performance results in improved estimates of a ship's position (when those estimates are velocity-based) for submerged vehicles (e.g., submarines, AUVs, UUVs, etc.). This is particularly important for submerged vehicles for which Global Positioning System (GPS) fixes are not available or otherwise kept to a minimum to maintain the ship's covertness. Another benefit of having high-performance velocity estimates is that they improve the accuracy of certain on-board missile-delivery systems that employ a technique to obtain a velocity fix, which is then provided as initialization data to the missile before launch. In other words, high-availability estimates reduce the missile Circular Error Probable (CEP).

The illustrative embodiment features a hydrophone-based system with correlation sonar processing. After reading this specification, those who are skilled in the art will further appreciate that the techniques described herein can be applied to other types of systems such as RADAR (RAdio Detection And Ranging).

The illustrative embodiment of the present invention comprises: receiving i) a first spatial velocity estimate obtained from a spatial correlation sonar process and ii) a first temporal velocity estimate obtained from a temporal correlation sonar process; and generating a composite velocity error that is based on the first spatial velocity estimate and the first temporal velocity estimate.

BRIEF DESCRIPTION OF THE DRAWINGS

FIG. 3 depicts a prior-art method for performing spatial correlation sonar processing.

DETAILED DESCRIPTION

Figure 1:
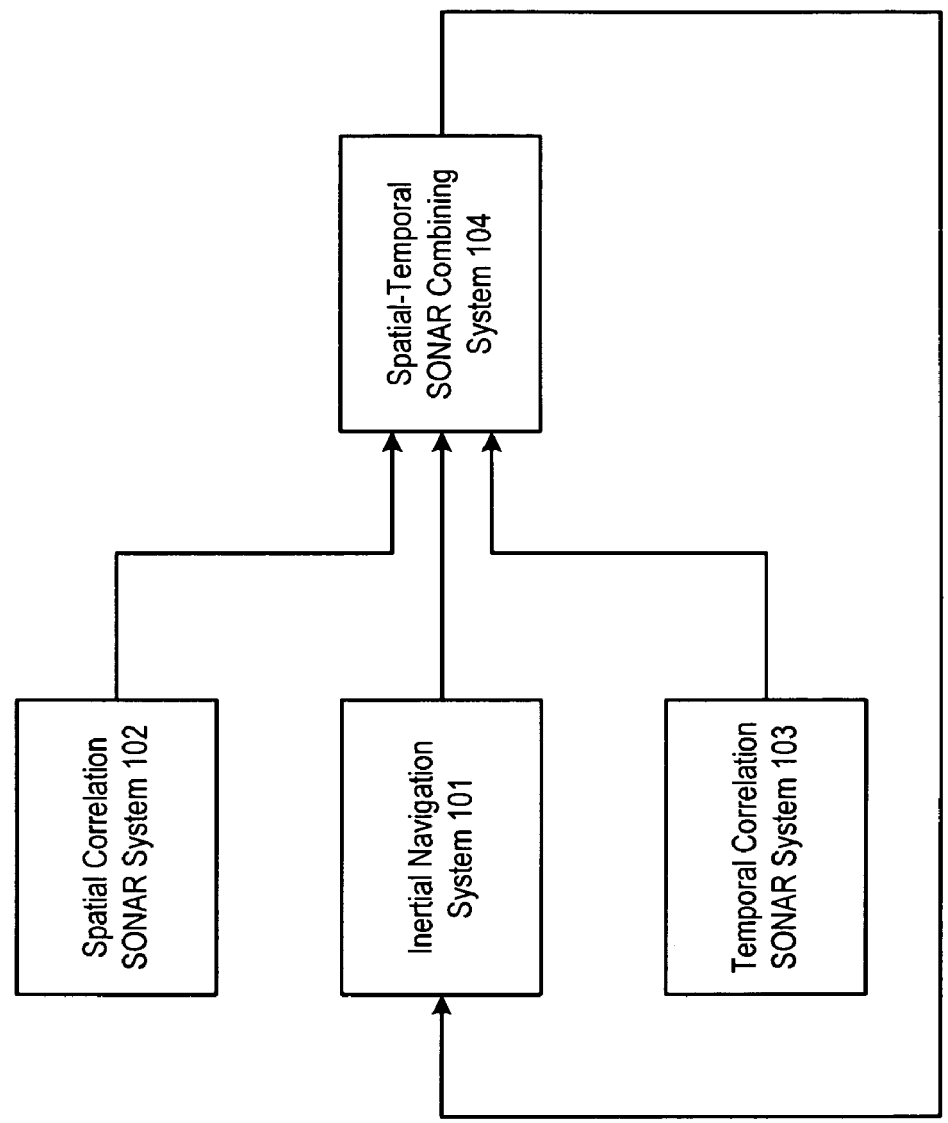
FIG. 1 depicts a block diagram of sonar processing system 100, in accordance with the illustrative embodiment of the present invention.

FIG. 1 depicts a block diagram of sonar processing system 100, in accordance with the illustrative embodiment of the present invention. System 100 comprises inertial navigation system 101, spatial correlation sonar system 102, temporal correlation sonar system 103, and spatial-temporal sonar combining system 104, interconnected as shown.

Inertial navigation system 101 is a navigation aid that continuously measures velocity without the need for external references, in well-known fashion. Because system 101 computes velocity independently of any external references, it is subject to integration drift, which results in progressively larger errors over time. In order to correct for the integration drift, system 101 accepts velocity corrections from an outside source, in this case from system 104. In turn, system 101 provides its velocity measurements to system 104.

Spatial correlation sonar system 102 provides to system 104 velocity measurements that are the result of spatial correlation processing. System 102 comprises an interface to sonar transceiver system 200, as described below and with respect to FIG. 2. System 102 further comprises a processor for performing the tasks described below and with respect to FIG. 3 for the purposes of exchanging signals with transceiver system 200 and for processing signals received from transceiver system 200 in order to determine velocity measurements.

Temporal correlation sonar system 103 provides to system 104 velocity measurements that are the result of temporal correlation processing. System 103 comprises an interface to sonar transceiver system 400, as described below and with respect to FIG. 4. System 103 further comprises a processor for performing the tasks associated with temporal correlation array processing, as described below and with respect to FIG. 5.

Spatial-temporal sonar combining system 104 comprises a receive interface for receiving velocity measurements from inertial navigation system 101, spatial correlation sonar system 102, and temporal correlation sonar system 103, as well as a transmit interface to provide inertial navigation system 101 with velocity measurement corrections. System 104 further comprises a processor for performing the tasks associated with processing the velocity measurements from systems 101, 102, and 103 for the purpose of generating the velocity measurement corrections. The salient tasks for generating the corrections are described below and with respect to FIG. 6.

Figure 2:
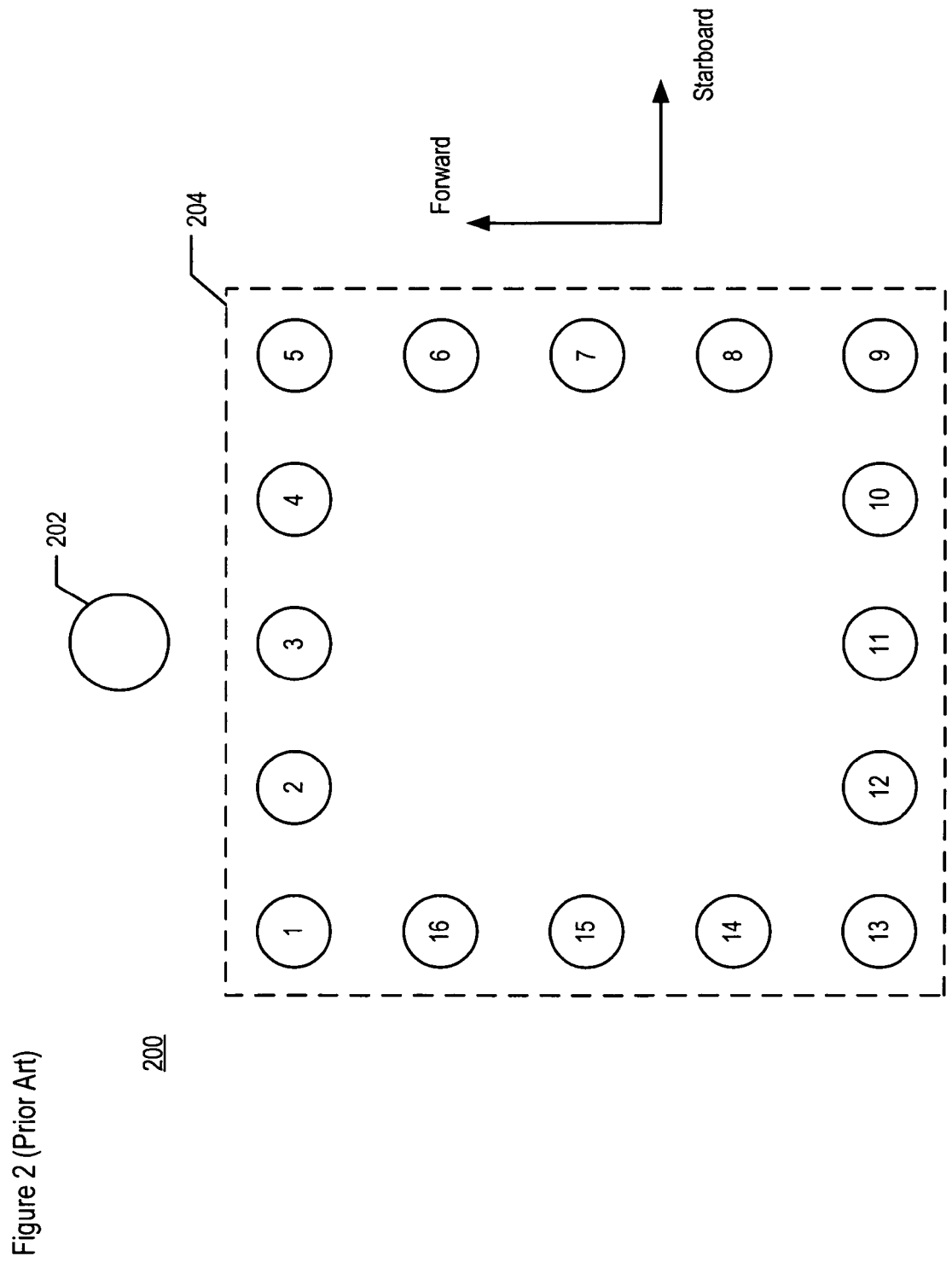
FIG. 2 depicts a schematic diagram of prior-art, spatial correlation sonar transceiver system 200.

FIG. 2 depicts a schematic diagram of prior-art, spatial correlation sonar transceiver system 200 for transmitting and receiving signals for the purpose of measuring velocity. The depicted transceiver system is considered here for pedagogical purposes; after reading this specification, those who are skilled in the art will appreciate that the embodiments described herein are applicable to other transceiver systems as well. System 200, which may be mounted on the underside of a ship, comprises transmitter 202 and receiver array 204. Receiver array 204 comprises receivers 1 through 16, wherein each receiver is commonly referred to as a "hydrophone." (The terms "receiver" and "hydrophone" are used interchangeably herein.)

The hydrophones in array 204 are used to perform sonar signal processing. One type of sonar signal processing is velocity-measuring, correlation sonar. A prior-art method for performing spatial correlation sonar processing is discussed with respect to FIG. 3. The processing that takes place as part of method 300 in FIG. 3 is discussed, in order to provide a basis of understanding for some of the concepts in the later-discussed technique of the illustrative embodiment.

At task 302 of method 300, a series of pulses are transmitted vertically towards the ocean bottom via transmitter 202.

At task 304, echoes are detected at each hydrophone in receiver array 204. For a ground-referenced correlation sonar, the echoes are returned from the ocean floor. For a water-referenced correlation sonar, the echoes are returned from the water volume beneath the ship.

At task 306, pulse echo data is amplified, converted from analog to digital, and then digitally filtered to yield in-phase ("I") and quadrature ("Q") data for each hydrophone channel. This I and Q data contains all of the amplitude and phase information contained in the echo pulses, but is base banded and thus vastly reduced in data rate from the A-to-D-converted echo signals.

In accordance with task 308, a pulse location algorithm is employed to define the leading edge of each pulse.

At task 310, a pair of prime hydrophones is identified for each of the ship's various possible velocity vectors, given the arrangement of receiver array 204. A channel-selection pair matrix, which includes all of the possible non-redundant ship's velocity vectors, is created as the result of performing task 310.

At task 312, I and Q data from a first echo pulse in a reference channel is correlated with I and Q data from a later echo pulse for each of the other channels, thereby forming a correlation product for each channel-selection pair (i.e., hydrophone pair). These individual correlation products together describe a measured correlation function.

At task 314, the hydrophone pair having the best correlation product (the "best-correlated" hydrophone pair) is identified.

At task 316, an M-by-M array of hydrophone-pair correlation products is formed (e.g., M equals three, etc.) in the channel-selection pair matrix, wherein the array is centered about the best-correlated hydrophone pair from task 314. A search for the peak of the correlation function is performed, which can possibly lie somewhere between the best-correlated hydrophone pair and another hydrophone pair in the M-by-M array. For example, an interpolation algorithm can be used on the correlation products, in order to find the location of the peak in relation to the hydrophone pairs.

The correlation function that is described by the correlation products and the peak is a relationship between i) the correlation between hydrophone pairs and ii) their displacement in the x and y directions, where "x" and "y" correspond to the fore/aft and athwart-ship directions, respectively. The location of the correlation peak provides "maximum-correlation distance" components in the fore/aft and athwart-ship directions. The velocity is determined at task 318 by dividing the maximum-correlation distance for each directional component by twice the time differential between the pulses.

Method 300 is repeated, periodically or sporadically, in order to provide successive velocity measurements.

Figure 4:
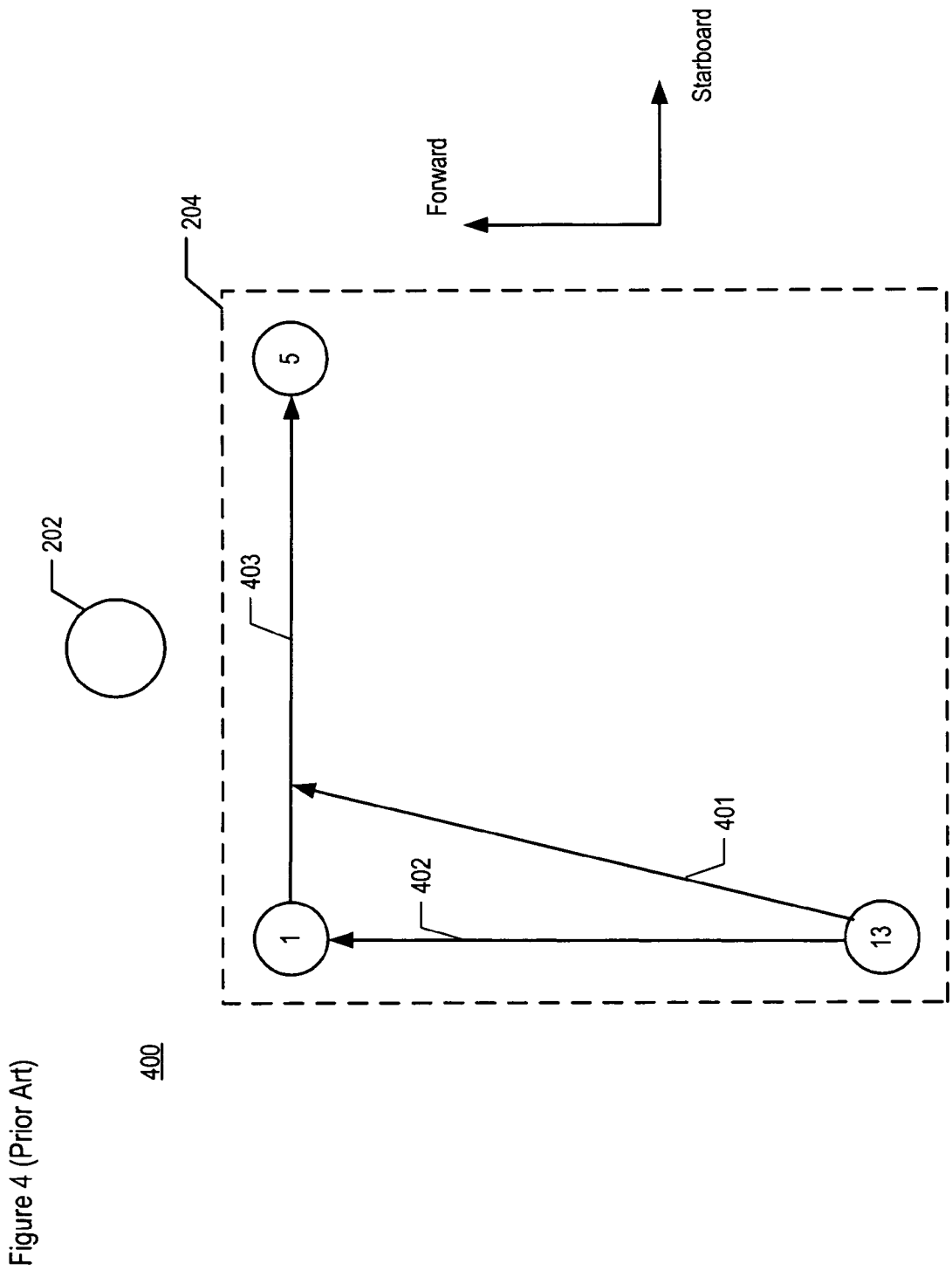
FIG. 4 depicts a schematic diagram of prior-art, temporal correlation sonar transceiver system 400.

FIG. 4 depicts a schematic diagram of prior-art, temporal correlation sonar transceiver system 400 for measuring velocity. The depicted transceiver system is considered here for pedagogical purposes; after reading this specification, those who are skilled in the art will appreciate that the embodiments described herein are applicable to other transceiver systems as well. FIG. 4 also depicts measured velocity vector 401, consisting of forward-aft component velocity component 402 and athwart-ships component 403.

In accordance with the illustrative embodiment, transceiver system 400 is identical to spatial correlation sonar transceiver system 200, shown in FIG. 2, except for the hydrophones that are used for velocity estimation and the velocity processing algorithms. No hardware changes are required to adapt transceiver system 200 to provide the hydrophone configuration of transceiver system 400, in that system 400 is able to use transmitter 202 and a subset of the hydrophones from receiver array 204, in accordance with the illustrative embodiment. The front-end processing, which includes preamplifiers, band pass filtering, and I-Q sampling, is the same for both system 200 and 400, as well as the transmit power levels and pulse patterns. In some alternative embodiments, as those who are skilled in the art will appreciate, physically distinct transmitters and hydrophones can be provided, as part of separate spatial and temporal array systems, or additional hydrophones can be used for one type of correlation processing (e.g., temporal, etc.) in relation to the other type (e.g., spatial, etc.).

Figure 5:
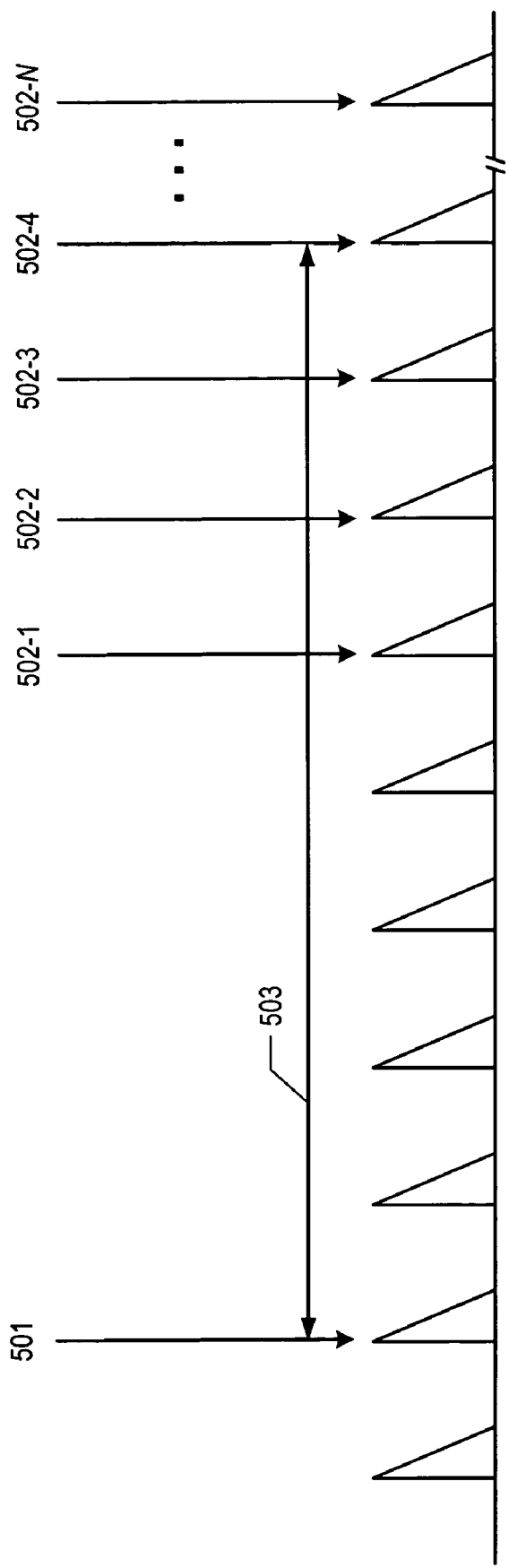
FIG. 5 depicts pulse train 500 that comprises pulse pairs used for temporal correlation processing.

FIG. 5 depicts pulse train 500 that comprises pulse pairs used for temporal correlation processing. The accompanying temporal processing uses an echo received from a first pulse at hydrophone 1 of FIG. 4, namely echo 501, with a number of echoes received at hydrophone 13 of FIG. 4, namely echoes 502-1 through 502-N for forward velocity estimation, wherein N is a positive integer greater than one. Similarly, the temporal processing uses an echo received from a first pulse at hydrophone 1 (such as echo 501) with a number of echoes received in hydrophone 5 (such as echoes 502-1 through 502-N) for athwart-ships velocity estimation. For each directional component, the time separation (such as interval 503) that corresponds to maximum pulse-pair correlation is related to the ship's velocity along that component. A detailed description of a temporal correlation sonar system can be found in "Bi-Directional Temporal Correlation Sonar" U.S. Pat. No. 6,804,167, which is incorporated herein by reference.

Figure 6:
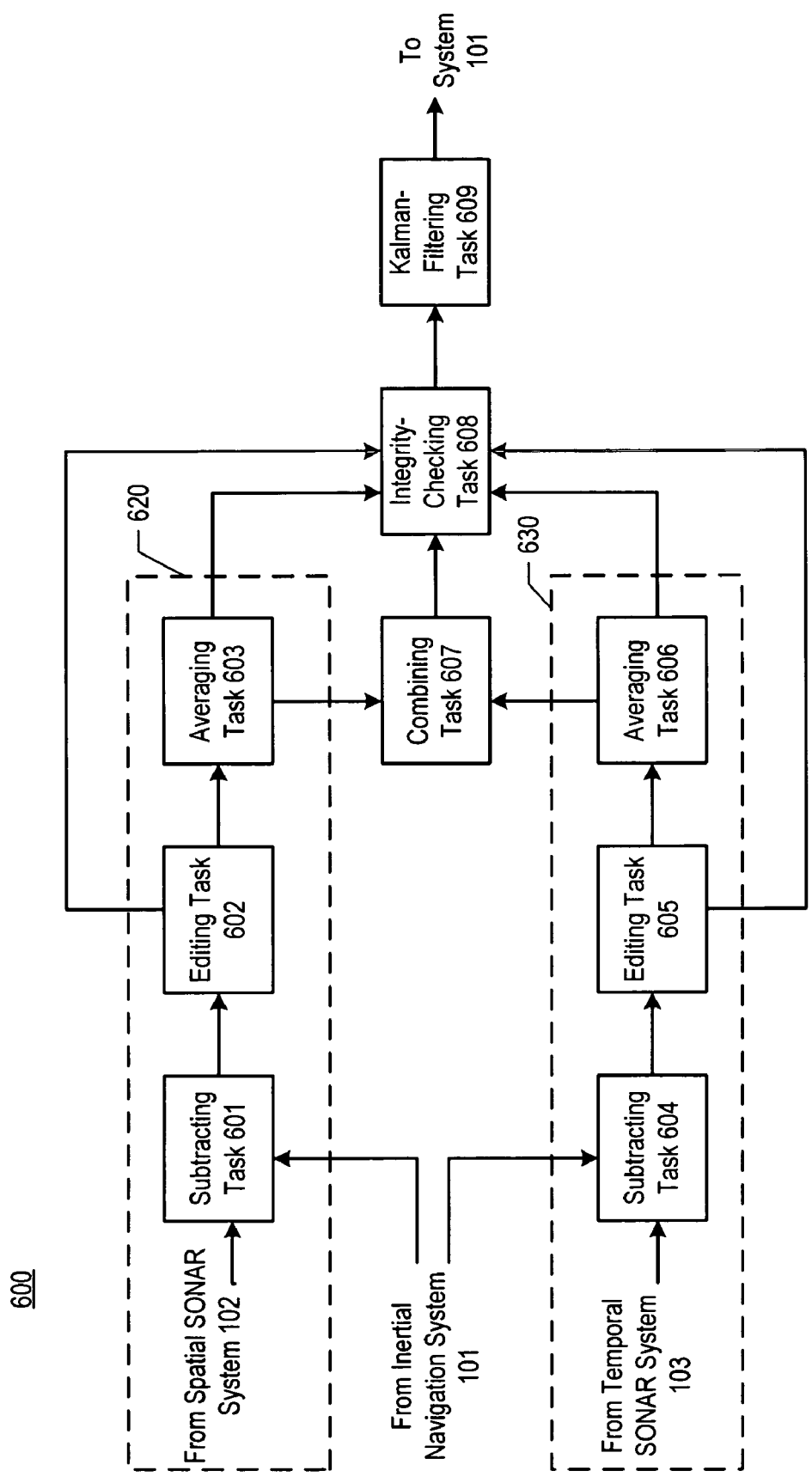
FIG. 6 depicts the processing associated with a single processing channel for a single directional component.

FIG. 6 depicts spatial-temporal correlation sonar combining system 104, in accordance with the illustrative embodiment of the present invention. As discussed above and with respect to FIG. 1, combining system 104 receives velocity measurements from inertial navigation system 101, spatial correlation array processing system 102, and temporal correlation array processing system 103, and uses those measurements to continuously generate corrections for the velocity measurements determined by inertial navigation system 101. As those who are skilled in the art will appreciate, after reading this specification, some of the tasks depicted in FIG. 6 can be performed in parallel or in a different order from that depicted.

FIG. 6 depicts the processing associated with a single processing channel for a single directional component such as north-south. The processing depicted in FIG. 6 can be replicated for a second processing channel, in order to cover a second directional component that is orthogonal to the first, such as east-west, as those who are skilled in the art will appreciate.

System 104 relies on spatial and temporal correlation processing. As part of the correlation processing, the sonar system of the illustrative embodiment transmits multiple pairs of pulses during each period referred to as a "sonar cycle," which refers to the interval between i) the first transmitted pulse of a burst of pulses and ii) the first transmitted pulse of the next burst of pulses. Pairs of echoes are then processed by spatial sonar processing system 102, and the same or other pairs of echoes are also processed by temporal sonar processing system 103. The outputs of processing systems 102 and 103 are sonar pulse-pair velocity estimates for a given directional component, wherein the estimates are used by tasks 601 and 604, respectively.

The spatial correlation processing path (i.e., path 620) is now described. At task 601, a velocity estimate (i.e., the "navigator velocity") received from inertial navigation system 101 is subtracted from a pulse-pair velocity estimate received from spatial correlation sonar processing system 102. The difference is referred to as the raw spatial velocity error for the particular directional component being evaluated (e.g., north-south). Note that the navigator velocities for these pulse pair differences are evaluated at the correlation sonar times; in other words, the navigator velocity represents the mean velocity between the two transmit pulses and two receive pulses for the pulse pair. The resultant raw spatial velocity error is provided to task 602, as part of a data stream of raw spatial velocity errors.

At task 602, the received data stream of raw spatial velocity errors is edited to eliminate values that are unacceptable due to excess noise, ocean bottom conditions, and other effects. In accordance with the illustrative embodiment, the raw spatial velocity error is subjected to an editing function, in which if the absolute value of an error value is in excess of an editing threshold (e.g., in velocity units of feet-per-second or knots, etc.) then the error value is discarded. The edited data stream is then provided to task 603, and data-editing results (e.g., statistics, etc.) are provided to task 608.

At task 603, the data within the received edited data stream is then averaged over one sonar cycle, and the result is provided to task 607, as part of a data stream of averaged spatial velocity errors.

The temporal correlation processing path (i.e., path 630) is described here and is similar to the spatial-related processing of tasks 601 through 603. At task 604, a velocity estimate (i.e., the "navigator velocity") received from inertial navigation system 101 is subtracted from a pulse-pair velocity estimate received from temporal correlation sonar processing system 103. The difference is referred to as the raw temporal velocity error for the particular directional component being evaluated (e.g., north-south). Note that the navigator velocities for these pulse pair differences are evaluated at the correlation sonar times; in other words, the navigator velocity represents the mean velocity between the two transmit pulses and two receive pulses for the pulse pair. The resultant raw temporal velocity error is provided to task 605, as part of a data stream of raw temporal velocity errors.

At task 605, the received data stream of raw temporal velocity errors is edited to eliminate values that are unacceptable due to excess noise, ocean bottom conditions, and other effects. In accordance with the illustrative embodiment, the raw temporal velocity error is subjected to an editing function, in which if the absolute value of an error value is in excess of an editing threshold (e.g., in velocity units of feet-per-second or knots, etc.) then the error value is discarded. The edited data stream is then provided to task 606, and data-editing results (e.g., statistics, etc.) are provided to task 608.

At task 606, the data within the received edited data stream is then averaged over one sonar cycle, and the result is provided to task 607, as part of a data stream of averaged temporal velocity errors.

At task 607, the averaged spatial and temporal velocity errors are merged. The key to the merging of the temporal and spatial data is a combining filter, which is now described. The combining filter takes as inputs the two data streams of the edited and averaged temporal and spatial velocity errors, and outputs an optimized combination of the two data streams. The selected optimization criteria are that the output has no bias error and a minimized mean square error. With these requirements, the filter takes the form of a weighted sum of the two data streams (spatial and temporal) with the weights being a function of the relative velocity errors. Thus, the filter output velocity correction estimate, $V_e$, can be represented as:

$$V_e = [\sigma^2_T/(\sigma^2_T+\sigma^2_S)] \, v_S + [\sigma^2_S/(\sigma^2_T+\sigma^2_S)] \, v_T, \text{wherein} \quad (1)$$

$v_S$=the spatial velocity error from task 603,
$v_T$=the temporal velocity error from task 606,
$\sigma^2_S$=variance of the spatial velocity error, and
$\sigma^2_T$=variance of the temporal velocity error.

As already mentioned, this equation is for a single velocity component, such as north-south.

Rearranging equation (1) yields:

$$V_e = [1/(1+\sigma^2_S/\sigma^2_T)] \, v_S + [1/(1+\sigma^2_T/\sigma^2_S)] \, v_T \quad (2)$$

Equation (2) shows that the filter coefficients are only a function of the relative spatial and temporal errors and not of their absolute values.

It has been shown (such as in Bradley, S., Deines, K., and Rowe, F. "Acoustic Correlation Current Profiler" *IEEE Journal of Oceanic Engineering* Vol. 16 Issue 4 October 1991 pp.408-414, incorporated herein by reference) that the standard deviation of the velocity estimate for a spatial correlation sonar, $\sigma_S$, is given by:

$$\sigma_S = \frac{1}{4\sqrt{\pi N_S}}\left(\frac{W_S}{t_c}\right)\left(1+\frac{1}{SNR}\right), \text{wherein} \quad (3)$$

$N_S$=the number of independent spatial samples,
$W_S$=the width of the spatial correlation function,
$t_c$=the correlation time delay, and
SNR=the signal-to-noise ratio.

Additionally, since $t_c$=RS/2V, wherein V=velocity and RS=the hydrophone separation for maximum spatial correlation, equation (3) becomes $$\sigma_S = \frac{V}{2\sqrt{\pi N_S}}\left(\frac{W_S}{RS}\right)\left(1+\frac{1}{SNR}\right) \quad (4)$$

It can be assumed that the equation for the standard deviation of the velocity estimate for a temporal correlation sonar, $\sigma_T$, has a similar form:

$$\sigma_T = \frac{V}{2\sqrt{\pi N_T}}\left(\frac{W_T}{T}\right)\left(1+\frac{1}{SNR}\right), \text{wherein} \quad (5)$$

$W_T$=the width of temporal correlation function,
T=the correlation time for maximum temporal correlation,
$N_T$=the number of independent temporal samples, and
SNR=the signal-to-noise ratio.

Additionally, V is assumed to be the same for spatial- and temporal-related standard deviation, since both processing paths are measuring the same velocity. SNR is the same for both processing paths since they share the same transmitting transducer and receiving hydrophones.

It is known that $W_T$=(T/RT)$W_S$, wherein RT is equal to the hydrophone separation for maximum temporal correlation. Thus, dividing equation (5) by equation (4) yields:

$$\sigma_T/\sigma_S = \sqrt{\frac{N_S}{N_T}} \, (RS/RT) \quad (6)$$

This result shows that the filter coefficients depend on two relative parameters: 1) the number of independent samples used in the velocity calculations, and 2) the correlation distances used. In practice, the number of independent samples can be taken as the number of pulse pairs that are used in the each sonar cycle. The spatial correlation distance, RS, is the equivalent hydrophone separation that yields the maximum correlation. The temporal correlation distance, RT, is the actual hydrophone separation of the two hydrophones used in the temporal processing. This ratio (temporal/spatial) varies as a function of the relative speeds in the fore-aft and athwartships directions. For the spatial correlation sonar hydrophone box array illustrated in FIG. 2 for mostly fore-aft speed, the ratio is about 4/3 (1.33) while for equal fore-aft and athwartships speeds, the ratio increases to about 5.6/2.8 (2). The ratio RS/RT also corresponds to a direct proportion relationship in velocity measuring bias error between the spatial and temporal correlation sonars.

The filter output velocity correction estimate, $V_e$, is then provided to the integrity filter of task 608.

At task 608, integrity tests are performed on the velocity correction data, in accordance with the illustrative embodiment. The integrity tests are performed every sonar cycle to determine if there should or should not be an output provided from the Kalman filter of task 609. This processing requires concurrent execution at a rate of once per sonar cycle of two integrity filters, one each for the spatial and temporal data streams. Each integrity filter receives the following data from its corresponding processing path (i.e., spatial processing path 620 and temporal processing path 630) every sonar cycle:

i) the number of pulse-pair velocity estimation attempts, as made by either system 102 (for spatial processing) or system 103 (for temporal processing);

ii) the number of pulse-pair velocity estimates computed (there may have been some failed velocity estimation attempts made by system 102 or 103); and iii) the raw spatial or temporal velocity errors for each pulse pair.

Each integrity filter generates a result based in part on the "filter fullness" value for the particular spatial or temporal processing path, which value is defined as follows. As described above and with respect to tasks 602 or 605, the raw spatial velocity data or raw temporal velocity data are subjected to an editing function that results in possibly some data being discarded. The ratio of i) pulse-pair errors surviving the editing to ii) the total number of pulse-pair velocity estimation attempts over a certain number of sonar cycles (or over a given time interval) is referred to as the "filter fullness" for the spatial data (i.e., ratio $R_S$) or temporal data (i.e., ratio $R_T$) and can be a value between 0 and 1, inclusive.

Task 608 receives editing data from tasks 602 and 605, the composite velocity error data from task 607, and the cycle-averaged data from tasks 603 and 606, in which the mean error values of all surviving pulse-pair velocity errors are computed over the same number of cycles or time (e.g., one sonar cycle, etc.) for each processing path. If the filter fullness of both the spatial and temporal paths is below a predetermined ratio value (for example 0.50) and are therefore unacceptable, then the Kalman filter will be instructed to provide no output, an alarm will be issued, and processing will continue with the next sonar cycle. If the filter fullness of both filters is greater than the predetermined ratio value, then the integrity testing will compare the mean error value of one path to the other. If the absolute values of these two long-term averages (for spatial and temporal) differ by more than a predetermined threshold value (in velocity units), then the Kalman filter will be instructed to provide no output and an alarm will be issued. Otherwise, the Kalman filter will be provided with the composite velocity error data from task 607, the Kalman filter's output will be enabled, and no alarm will be issued.

In some embodiments, the results from the integrity tests are presented to a status display, for the purpose of notifying an equipment operator of the velocity measurement statistics. Moreover, in some embodiments, integrity tests can be done as part of the Kalman filter processing (for example, by evaluating the Kalman input data variability or Kalman output levels) instead of, or in addition to, the pre-Kalman filter integrity tests described herein.

As those who are skilled in the art will appreciate different numerical methods can be used to compute the long-term averages. For example, the edited velocity corrections provided by tasks 602 and 605 can be used in the averaging, or the averaged velocity corrections provided by tasks 603 and 606 can be used in order to reduce the number of computations needed.

At task 609, Kalman filtering, as is known in the art, is performed on the data stream of velocity corrections received from task 608. As is well-known in the art, a spatial correlation sonar or a temporal correlation sonar is most effective when its noisy but unbiased velocity estimates are used to correct low-noise, slowly-varying inertial navigator velocity errors (i.e., varying at the Schuler rate or less). To account for the noisy component attributable to the correlation sonar velocity measurement data, the velocity correction estimates are filtered at task 609 by a Kalman filter. This results in an improved estimate of the error in the navigator velocity measurements. As those who are skilled in the art will appreciate, a type of filter different than a Kalman filter can be used, in some alternative embodiments.

The Kalman-filtered velocity corrections are then provided to inertial navigation system 101 for the purpose of correcting the inertial-based, velocity estimate.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving i) a first spatial velocity estimate obtained from a spatial correlation sonar process and ii) a first temporal velocity estimate obtained from a temporal correlation sonar process; and
generating a composite velocity error that is based on the first spatial velocity estimate and the first temporal velocity estimate.

2. The method of claim 1 wherein the first spatial velocity estimate and the first temporal velocity estimate are based on signals received from the same hydrophone array.

3. The method of claim 2 wherein generating the composite velocity error comprises combining a first spatial velocity error obtained from the first spatial velocity estimate and a first temporal velocity error obtained from the first temporal velocity estimate.

4. The method of claim 3 further comprising averaging the samples in a first data stream to form the first spatial velocity error, wherein one of the samples in the first data stream is based on the first spatial velocity estimate.

5. The method of claim 4 further comprising removing at least one sample in a second data stream to form the first data stream based on noise that is present.

6. The method of claim 5 further comprising comparing the first spatial velocity estimate with an independent velocity estimate obtained from an inertial navigation system, thereby forming at least one of the samples in the second data stream.

7. The method of claim 3 further comprising performing Kalman filtering on the composite velocity error, resulting in an inertial velocity error.

8. The method of claim 7 further comprising:
monitoring a data stream of spatial velocity errors that comprises the first spatial velocity error and at least one other spatial velocity error, and a data stream of temporal velocity errors that comprises the first temporal velocity error and at least one other temporal velocity error; and
adjusting the inertial velocity error based on the monitoring.

9. A method comprising:
  receiving i) a spatial velocity estimate obtained from a spatial correlation sonar process and ii) a temporal velocity estimate obtained from a temporal correlation sonar process;
  generating i) a spatial velocity error that is based on the spatial velocity estimate and at least one independent velocity estimate obtained from an inertial navigation system, and ii) a temporal velocity error that is based on the temporal velocity estimate and on the at least one independent velocity estimate; and
  combining the spatial velocity error and the temporal velocity error to form a composite velocity error.

10. The method of claim 9 wherein the combining task comprises calculating a weighted average of the spatial velocity error and the temporal velocity error.

11. The method of claim 10 wherein coefficients that are used in the weighted average are a function of a filtering ratio that is based on the standard deviation of the temporal velocity error divided by the standard deviation of the spatial velocity error.

12. The method of claim 10 wherein coefficients that are used in the weighted average are a function of a filtering ratio that is based on the square root of the ratio of i) the number of independent samples used to determine the spatial velocity error, $N_S$, to ii) the number of independent samples used to determine the temporal velocity, $N_T$.

13. The method of claim 12 wherein the filtering ratio is also based on the ratio of i) a first hydrophone separation that is based on maximum spatial correlation, RS, to ii) a second hydrophone separation that is based on maximum temporal separation, RT.

14. The method of claim 13 wherein the second hydrophone separation is the actual hydrophone separation of two hydrophones from which signals are received that are used to determine the temporal velocity error.

15. A method comprising:
  processing one or more spatial pulse-pair velocity estimates that were successfully obtained from one or more spatial pulse-pair velocity estimation attempts made by a spatial correlation sonar process, whereby a raw spatial data stream is formed;
  removing one or more samples in the raw spatial data stream when the absolute values of the one or more samples exceed a predetermined editing threshold, whereby an edited spatial data stream is formed;
  averaging the samples in the edited spatial data stream to form a spatial velocity error data stream that comprises a spatial velocity error; and
  determining whether to perform Kalman filtering on a composite velocity error that is based on i) the spatial velocity error and ii) a temporal velocity error that is based on data from a temporal correlation sonar process;
  wherein the determining is based on a ratio $R_S$ of the number of samples in the edited spatial data stream to the number of spatial pulse-pair velocity estimation attempts, for a given time interval.

16. The method of claim 15 further comprising:
  processing one or more temporal pulse-pair velocity estimates that were successfully obtained from one or more temporal pulse-pair velocity estimation attempts made by the temporal correlation sonar process, whereby a raw temporal data stream is formed;
  removing one or more samples in the raw temporal data stream when the absolute values of the one or more samples exceed a predetermined editing threshold, whereby an edited temporal data stream is formed;
  averaging the samples in the edited temporal data stream to form a temporal velocity error data stream that comprises the temporal velocity error;
  wherein the determining is also based on a ratio $R_T$ of the number of samples in the edited temporal data stream to the number of temporal pulse-pair velocity estimation attempts, for the given time interval.

17. The method of claim 16 wherein Kalman filtering is not performed on the received composite velocity error when both the ratio $R_S$ and the ratio $R_T$ are less than a predetermined ratio value.

18. The method of claim 17 wherein Kalman filtering is also not performed on the received composite velocity error when:
  i) both of the ratios $R_S$ and $R_T$ are greater than the predetermined ratio value, and
  ii) the absolute value of the spatial velocity error and the absolute value of the temporal velocity error differ by more than a predetermined threshold value.

19. An apparatus comprising:
  a receiver array that comprises a plurality of hydrophones;
  means for generating i) a first spatial velocity estimate obtained from a spatial correlation sonar process and ii) a first temporal velocity estimate obtained from a temporal correlation sonar process; and
  means for generating a composite velocity error, based on the first spatial velocity estimate and the first temporal velocity estimate.

20. The apparatus of claim 19 further comprising a transmitter that transmits a series of pulses.

21. The apparatus of claim 20 wherein the receiver array is a planar array of sixteen hydrophones for receiving echoes that are based on the transmitted series of pulses.

22. The apparatus of claim 21 further comprising means for i) developing an independent velocity estimate independently of signals from the planar array, ii) comparing the first spatial velocity estimate to the independent velocity estimate, resulting in a first spatial velocity error, and iii) comparing the first temporal velocity estimate to the independent velocity estimate, resulting in a first temporal velocity error;
  wherein the composite velocity error is based on the first spatial velocity error and the first temporal velocity error.

23. The apparatus of claim 22 further comprising means for averaging the samples in a first data stream that comprises a first sample that is based on the first spatial velocity error and on a second sample that is based on a second spatial velocity error, resulting in an averaged spatial velocity error, wherein the composite velocity error is based on the averaged spatial velocity error.

24. The apparatus of claim 22 further comprising:
  means for monitoring a data stream of spatial velocity errors that comprises the first spatial velocity error and at least one other spatial velocity error, and a data stream of temporal velocity errors that comprises the first temporal velocity error and at least one other temporal velocity error; and
  adjusting the independent velocity estimate based on the monitoring.

* * * * *

UNITED STATES PATENT AND TRADEMARK OFFICE
CERTIFICATE OF CORRECTION

| | | |
|---|---|---|
| PATENT NO. | : 7,768,873 B2 | Page 1 of 1 |
| APPLICATION NO. | : 12/042198 | |
| DATED | : August 3, 2010 | |
| INVENTOR(S) | : Scoca et al. | |

It is certified that error appears in the above-identified patent and that said Letters Patent is hereby corrected as shown below:

Col. 1, line 3, insert following the title:

--GOVERNMENT INTEREST

This invention was made with Government support under Government Contract Nos. N00030-08-C-0002 and N00030-10-C-0002 awarded by the Department of the Navy. The Government has certain rights in the invention.--

Signed and Sealed this

Seventeenth Day of May, 2011

David J. Kappos
*Director of the United States Patent and Trademark Office*